2,944,007

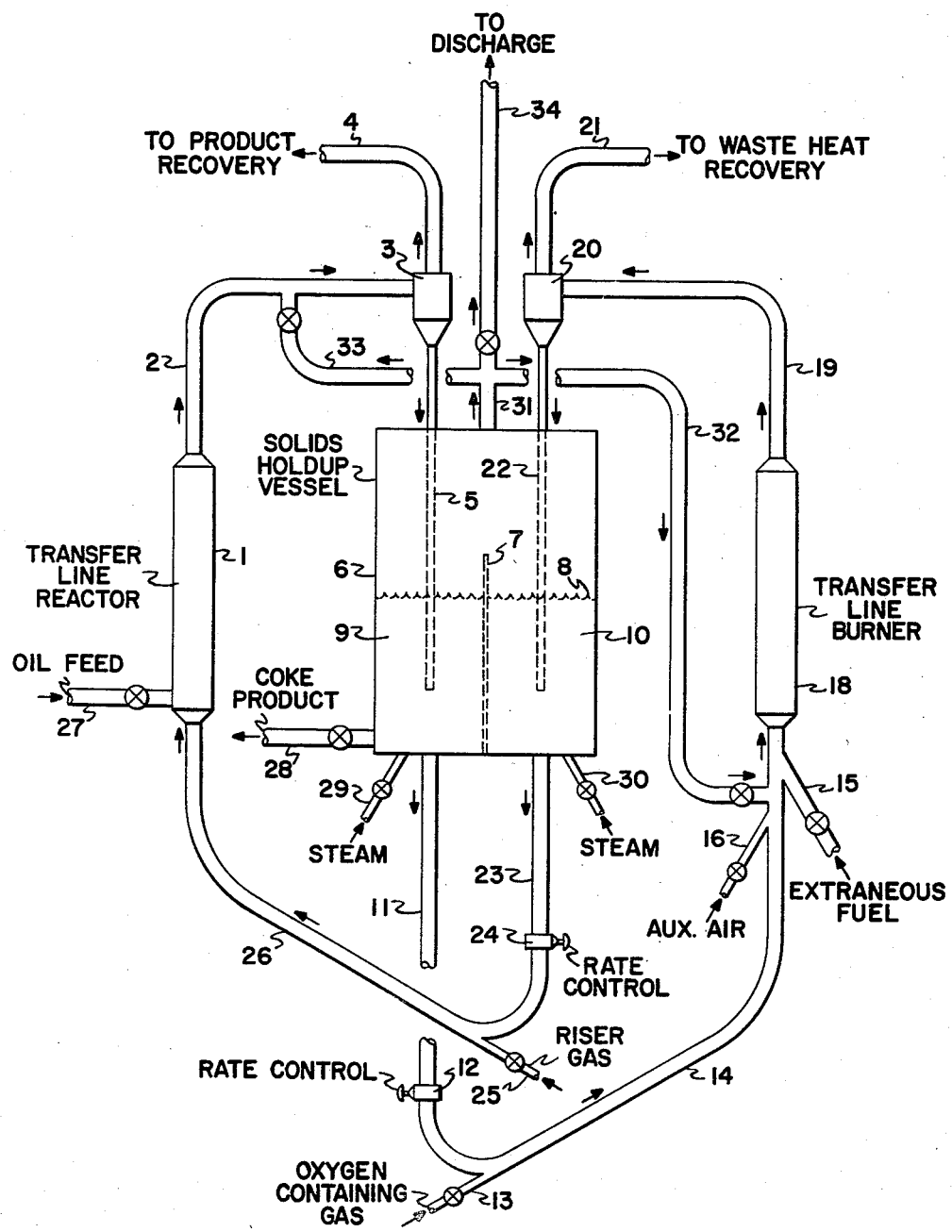

SOLIDS SYSTEM FOR TRANSFER LINE COKING OF RESIDUA

William Joseph Metrailer, Baton Rouge, La., assignor to Esso Research and Engineering Company, a corporation of Delaware Filed Dec. 5, 1956, Ser. No. 626,513

17 Claims. (Cl. 208—127)

This invention relates to a two-step solids operation such as a combination conversion and heat generation process. More particularly, it deals with the transfer line coking of heavy hydrocarbon oil for the production of olefins, diolefins, aromatics and other light hydrocarbon products, and the efficient and uniform circulation of particulate solids throughout such a system.

The coking of residuum, crudes and other hydrocarbon oils by subjecting the feed to high temperature, short contact time with a fluidized stream of hot, inert particulate solids is well known in the art. Typically such feeds have an initial boiling point above about 700° F., an A.P.I. gravity of about 0° to 20°, and a Conradson carbon residue content of about 5 to 40 wt. percent. The hydrocarbon feed is converted to lighter distillates, valuable chemical products, and carbonaceous residue which is continuously deposited upon the contact solids. After separation of the gaseous conversion products from the coking product stream, normally at least a portion of the solids are sent to a burner, preferably a transfer line burner. The partial combustion of the solids in the burner serves as a source of heat for the entire conversion process while helping to maintain a constant amount of coke within the system. The heated particles may then be circulated from the burner zone to the transfer line reactor so that the hydrocarbon oil is subjected to requisite high temperature contact.

However, in the past, considerable difficulty has been encountered in the operation of dual solids systems such as that described for the transfer line coking of residua. Circulation of solids has not been uniform due to disturbances in the supply of solids. Balanced circulation of particles between the burner and reactor has proven to be troublesome. Slight interruptions or deviations from normal conditions in the coking or burning zones have affected the entire reaction system. Feed rates, and hence the yields of desired products, are particularly sensitive to changes in the quantities of solids circulated. Since the solids inventory in a transfer line, and hence the heat content of the solids, are relatively small, continuous and uniform flow of particles in such a system is particularly critical.

This invention provides an improved method for coking hydrocarbon oils in a transfer line reactor and burning at least a portion of the carbonaceous solids thus formed, while preserving the smooth circulation of solids. According to the present invention, a single, intermediate holdup vessel with a relatively large solids capacity is maintained between the coking and combustion zones. A substantial portion of the vessel is partitioned into two reservoir sections. Communication means responsive to differences in quantities of solids in the reservoirs permit the flow of particles from one section to the other. Heated particles from the burner are maintained in one section, hot solids being continuously withdrawn from this section under careful control, and circulated to the transfer line reactor. The solids separated from the reactor product stream are maintained in the second reservoir section, and are continuously withdrawn and circulated to the burner wherein they undergo heating. When the solids inventory builds up to a prescribed limit in either section, due to unbalanced circulation rates, the particles overflow into the section of smaller solids content.

The present invention will be better understood with reference to the following description, example and accompanying drawing which illustrates a dual transfer line solids system, although it should be understood that the present invention may find application wherever continuous flow of solids between vessels is desired.

The system comprises a transfer line reactor 1, a transfer line burner 18, and holdup vessel 6. Hydrocarbon oil feed such as residuum, suitably preheated, is fed by line 27 into transfer line reactor 1, wherein it is contacted with hot, inert particulate solids at a temperature of about 1400° F., supplied through riser 26. These solids are normally coke particles ranging in size from about 0 to 1000 microns, 20 to 400 microns being the average, although sand, ceramic materials and the like may be utilized. The temperature within the transfer line reactor is about 1300° F., and contact times of approximately 0.1 to 5.0 seconds are employed. The conversion products then pass by line 2 to cyclone 3 wherein gas-solids separation is accomplished. The gaseous reaction products flow out of the cyclone through line 4 and are sent to further processing for recovery of individual constituents as is well known in the art.

The reactor solids containing carbonaceous material deposited during the coking operation pass down cyclone dipleg 5 into holdup vessel 6. Holdup vessel 6 is partitioned by baffle 7 into sections 9 and 10. Baffle 7 extends only part way up from the bottom of the vessel 6 to provide an open communication space at the upper part of the vessel 6 above baffle 7. Section 9 serves as a reservoir chamber for the solids separated from the conversion stream. Similarly, an inventory of solids from the transfer line burner is maintained in section 10. The level of particles in these two sections is substantially the same during normal periods of balanced circulation rates and is indicated by level 8. Cyclone dipleg 5 extends into section 9, usually below the level of the solids maintained therein. The solids in sections 9 and 10 may be fluidized by introduction of steam through lines 29 and 30. In this way, the particles are kept in a mobile state, while occluded hydrocarbons are simultaneously stripped off the solids.

A stream of relatively cool solids is withdrawn from reservoir section 9 and passed down standpipe 11. A solid rate control device 12 permits the flow of solids to be readily altered in response to changes in operating conditions. The solids are then conveyed into riser 14, preferably by a stream of oxygen-containing gas introduced through line 13, the gas serving both as a conveying medium and as a source of requisite oxygen. In cases where the value of the coke is greater than that of extraneous liquid or gaseous fuel, a portion of the coke may be withdrawn from the system by outlet 28, and extraneous fuel is introduced by line 15 into the feed stream entering burner 18. The burner is preferably a transfer line burner, although other types of burners such as a fluid bed burner may be employed. Transfer line burner 18 is preferably lined with refractory materials, since combustion temperatures of as high as 1800° may be realized. A portion of the carbonaceous materials is consumed in the burner thereby heating the stream leaving the burner by line 19 to normally 100° to 400° F. above the desired coking temperatures.

Heated solids are separated from the exit burner stream in cyclone 20 and passed by dipleg 22, generally below level 8, into reservoir section 10. Gaseous burner products are sent by line 21 to waste heat recovery and discharge from the system. A continuous stream of hot particles, regulated by control device 24, is withdrawn from reservoir section 10 through standpipe 23. The particles are conveyed upwards into riser 26, by means of a carrier gas such as steam or light hydrocarbons introduced by line 25. The solids then flow into reactor 1, thereby supplying requisite high temperature particles for the coking reaction.

During periods of unbalanced circulation of solids, the inventory of solids in one of the reservoir sections increases until the level of the solids reaches the upper extremity of baffle 7. The particles then overflow into the reservoir of smaller solids content. Thus, solids are at all times provided to standpipes 11 and 23 for circulation. This results in a more stable system and permits the use of a single holdup vessel of moderate size in a dual transfer line system.

On occasion it is desirable to increase the circulation through one of the transfer line systems. The present invention is particularly adaptable to this type of operation. For instance, the solids rate to the burner may be increased to improve burning by merely opening the solid control device 12. The higher solids rate will simply raise the level of solids in reservoir section until it overflows the baffle 7; the overflowing solids then being recycled to the burner. Other dual transfer line systems require extra standpipes, control devices and risers to perform this simple operation.

The off gases from the holdup vessel are removed by line 31, and may be further processed, utilized, or simply discharged by line 34. As shown in the drawing, the off gases may be sent through line 32 to burner 18 for use as fuel. Operating in this manner, auxiliary air may be introduced by line 16, if required. In another method of operation, the gases from the holdup vessel may pass through line 33 and discharge into the transfer line product stream before cyclone 3, thus recovering any valuable hydrocarbon products present in the off gases.

Although the drawing illustrates a holdup vessel containing a baffle element, other means for maintaining separation of solids reservoir sections up to a prescribed limit of solids buildup, such as a partitioning wall containing a two-directional flapped portion, may be readily employed, and should be construed as falling within the spirit of the present invention. the term "semi-partitioned" is to be understood as connoting the above type of section.

The following table, with reference to the drawing, summarizes pertinent conditions in a preferred embodiment of the present invention.

| Holdup Vessel—6 | Preferred Range | Example [1] |
|---|---|---|
| Solids Inventory Distribution: | | |
| Reaction Transfer Line System, wt. Percent of Total | 5–20 | 10 |
| Burner Transfer Line System, wt. Percent of Total | 5–20 | 10 |
| Hot Solids Reservoir 10, Percent wt. of Total | [2] 20–55 | [2] 50–30 |
| Cold Solids Reservoir 9, Percent wt. of Total | [2] 20–55 | [2] 30–50 |
| Temperature of Solids in Reservoir Section 9, °F | 1,100–1,500 | 1,300 |
| Temperature of Solids in Reservoir Section 10, °F | 1,300–1,600 | 1,500 |
| Transfer Line reactor—1: | | |
| Temperature of added solids, °F | 1,200–1,600 | 1,450 |
| Temperature of Reaction, °F | 1,100–1,500 | 1,300 |
| Density of Suspension in Reactor, lb./ft.$^3$ | 0.5 to 4 | 1 |
| Average Residence Time, sec | 0.1 to 5.0 | 0.2 |
| Transfer Line Burner: | | |
| Temperature of Combustion, °F | 1,300–1,800 | 1,600 |
| Residence Time, sec | 0.1 to 5.0 | 0.3 |

[1] Based upon coking of a Hawkins residum, I.B.P. above 900° F. with particulate coke of less than 10000 microns in size, and averaging 200 microns.
[2] Height of baffle 7 fixed so that solids overflow when difference in reservoir section inventories exceeds 10–40 weight percent of total reservoir inventory.

While the above description has been limited to both a coking and burning operation occurring in transfer in line reactors, the use of a two zone, intermediate vessel with a substantial holdup capacity may find application in other dual solids processes, such as those utilizing fluid bed coking, catalytic conversions of hydrocarbons, and regeneration of catalysts or other contacting agents.

The advantages of the present invention will be obvious to those persons skilled in the art. By maintaining a separate reservoir of solids, continuous circulation of particles may be maintained during disruptions in normal operations. Any change in the balanced circulation rates between the major reaction vessels is compensated for by the equalization of solids holdup in the reservoir sections. Uniform and continuous solids circulation is preserved, and a more stable system realized.

Having described the invention, what is sought to be protected by Letters Patent is concisely set forth in the following claims.

What is claimed is:

1. The process of converting a hydrocarbon oil to lighter hydrocarbons and coke, which comprises contacting an oil feed in a reaction zone with hot, particulate solids, separating the product stream from said reaction zone into gaseous conversion products and solids, passing said solids into a semi-partitioned section of a solids holdup zone, withdrawing solids from said section and passing said solids along with an oxygen-containing gas to a heating zone, separating the effluent of said heating zone to recover heated solids, passing said heated solids to a second semi-partitioned section of said holdup zone, withdrawing hot solids from said second section and passing said solids to said reaction zone, solids being passed from one semi-partitioned section to the other in response to differences in solids inventories between said sections.

2. The process of claim 1 wherein said particulate solids are coke particles.

3. The process of claim 1 wherein said reaction zone is a transfer line reactor maintained at a temperature of 1200 to 1600° F.

4. The process of claim 1 wherein the quantities of solids in said semi-partitioned sections are maintained substantially equal by the flow of a portion of said solids between said sections.

5. The process of claim 1 wherein gas issuing from said holdup zone is passed to said heating zone.

6. The process of claim 1 wherein gas issuing from said holdup zone is introduced into the product stream from said reaction zone.

7. A process for converting hydrocarbon oils to lighter hydrocarbons which comprises contacting a hydrocarbon oil feed in a reaction zone with hot particulate solids, separating the product stream from said reaction zone into vaporous conversion products and solids, passing said solids into a reservoir zone in the bottom portion only of a solids holdup zone, withdrawing solids from said reservoir zone and passing them along with air to a heating zone, separating heated solids from the effluent from said heating zone, passing the separated heated solids to a second reservoir zone in the bottom portion only of said solids hold-up zone and adjacent said first reservoir zone, withdrawing heated solids from said second reservoir zone and passing them to said reaction zone and overflowing solids from one reservoir zone to another reservoir zone whenever too great a quantity of solids accumulates in one of said reservoir zones.

8. Apparatus of the character described which includes a reactor, a burner and a holdup vessel, a vertically arranged baffle extending up from the bottom of said vessel for only part of the height of said vessel to provide separate contiguous reservoirs in the lower portion of said vessel with an open communicating space thereabove whereby under certain conditions solids from one reservoir may overflow said baffle and pass to another of said reservoirs, means for separating solids from gasiform material leaving said reactor, said means including a dip pipe for returning separated solids to one of said reservoirs, a second means for separating solids from gasiform material leaving said burner, said second means including a dip pipe for returning said last-mentioned separated solids to another of said reservoirs, a conduit communicating with one of said reservoirs for passing solids from said reservoir to said burner, a second conduit communicating with another of said reservoirs for passing solids to said reactor and outlet pipe means leading from said vessel to remove gaseous material therefrom.

9. A process according to claim 7 wherein said reaction zone is a transfer line reaction zone and said heating zone is a transfer line heating zone and in which zones solids and gasiform material pass upwardly through said zones and are taken off overhead.

10. A process according to claim 1 in which said reaction zone is a transfer line reaction zone and said heating zone is a transfer line heating zone.

11. A process according to claim 7 wherein the process is one for the coking of heavy hydrocarbons to produce lower boiling hydrocarbons and coke.

12. A process according to claim 7 wherein gasiform material is withdrawn from said reservoir zones through a common confined outlet passageway.

13. An apparatus according to claim 8 wherein said reactor is a transfer line reactor and said burner is a transfer line burner.

14. Apparatus of the character described for circulating finely divided solids and gasiform material which includes, in combination, a reactor, a burner and a holdup vessel, a vertically arranged baffle extending up from the bottom of said vessel for only part of the height of said vessel to provide separate contiguous reservoirs in the lower portion of said vessel with an open communicating space thereabove whereby under certain conditions solids from one reservoir may overflow said baffle and pass to another of said reservoirs, means for separating solids from gasiform material leaving said reactor and for returning separated solids to one of said reservoirs, a second means for separating solids from gasiform material leaving said burner and for returning said last-mentioned separated solids to another of said reservoirs, a conduit communicating with one of said reservoirs for passing solids from said reservoir to said burner, a second conduit communicating with another of said reservoirs for passing solids to said reactor and outlet pipe means leading from said holdup vessel to remove gaseous material therefrom.

15. Apparatus of the character described adapted for circulating finely divided solids and gasiform material which includes, in combination, a reactor, a burner and a holdup vessel, a vertically arranged baffle extending up from the bottom of said vessel for only part of the height of said holdup vessel to provide separate contiguous reservoirs in the lower portion of said holdup vessel with an open communicating space thereabove whereby under certain conditions solids from one reservoir may overflow said baffle and pass to another of said reservoirs, means for withdrawing solids and gasiform material from said reactor, means for passing said withdrawn solids to one of said reservoirs, means for withdrawing solids and gasiform material from said burner, means for passing said last-mentioned withdrawn solids to another of said reservoirs, a conduit communicating with one of said reservoirs for passing solids from said reservoir to said burner, a second conduit communicating with another of said reservoirs for passing solids to said reactor and outlet pipe means leading from said holdup vessel to remove gaseous material therefrom.

16. Apparatus of the character described adapted for circulating finely divided solids and gasiform material which includes, in combination, a first treating vessel, a heat treating unit, a central solids holdup vessel, a vertically arranged baffle extending up from the bottom of said holdup vessel for only part of the height of said vessel to provide separate continuous reservoirs in the lower portion of said vessel with an open communicating space thereabove whereby under certain conditions solids from one reservoir may overflow said baffle and pass to another of said reservoirs, means for separating solids from gasiform material leaving said first treating vessel and for returning separated solids to one of said reservoirs, second means for separating solids from gasiform material leaving said heat treating unit and for returning said last-mentioned separated solids to another of said reservoirs, a conduit communicating with one of said reservoirs for passing solids from said reservoir to said heat treating unit, a second conduit communicating with another of said reservoirs for passing solids to said first treating vessel and outlet pipe means leading from said holdup vessel to remove gasiform material therefrom.

17. A process for converting hydrocarbon oils to lighter hydrocarbons which comprises contacting a hydrocarbon oil feed in a reaction zone with hot particulate solids, withdrawing vaporous conversion products and solids from said reaction zone, passing said withdrawn solids into a reservoir zone in the bottom portion only of a solids holdup zone, withdrawing solids from said reservoir zone and passing them along with air to a heating zone, withdrawing heated solids and gaseous effluent from said heating zone, passing said withdrawn heated solids to a second reservoir zone in the bottom portion only of said solids holdup zone and adjacent said first reservoir zone, withdrawing heated solids from said second reservoir zone and passing them to said reaction zone and overflowing solids from one reservoir zone to another reservoir zone whenever too great a quantity of solids accumulates in one of said reservoir zones.

References Cited in the file of this patent

UNITED STATES PATENTS

| | | |
|---|---|---|
| 2,362,270 | Hemminger | Nov. 7, 1944 |
| 2,428,715 | Marisic | Oct. 7, 1947 |
| 2,443,714 | Arveson | June 22, 1948 |
| 2,445,328 | Keith | July 20, 1948 |
| 2,471,104 | Gohr | May 24, 1949 |
| 2,661,324 | Leffer | Dec. 1, 1953 |
| 2,829,955 | Goedkoop | Apr. 8, 1958 |